Feb. 4, 1941. W. C. MacFADDEN 2,230,898
FASTENER ATTACHED STRUCTURE AND FASTENER FOR THE SAME
Filed Nov. 15, 1937
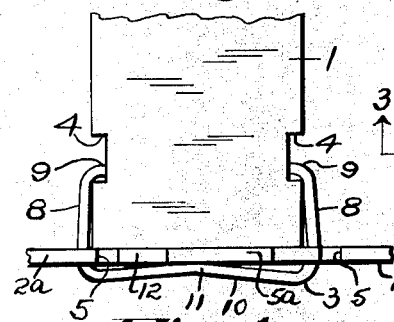
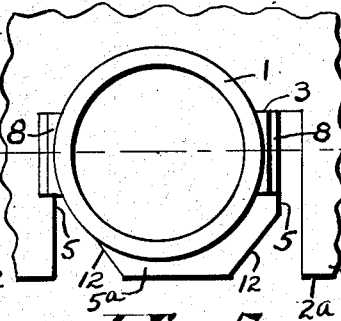
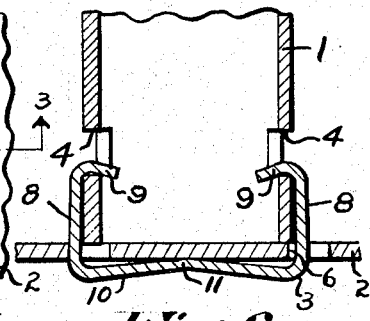
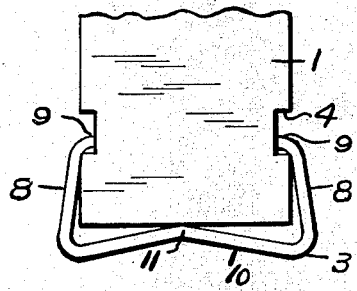
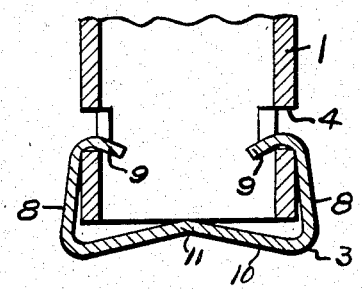
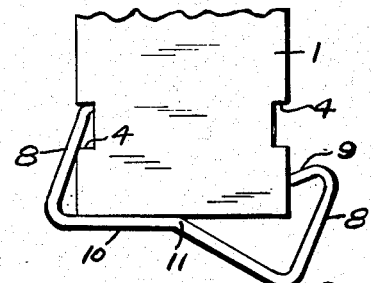
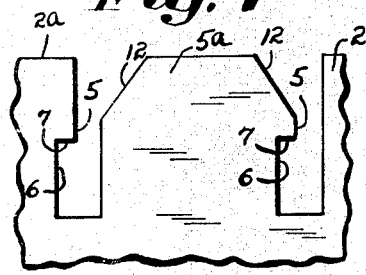
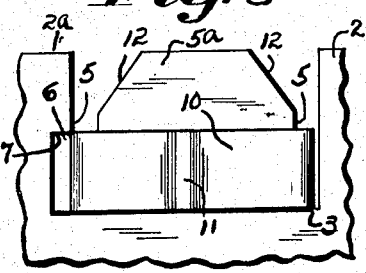
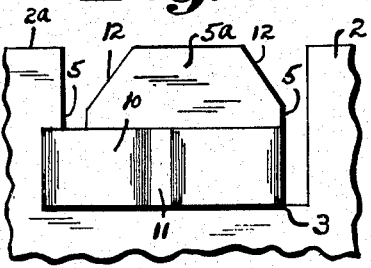
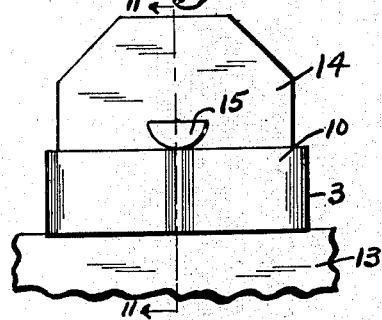
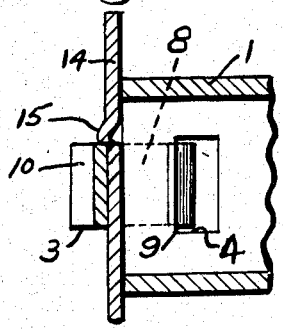
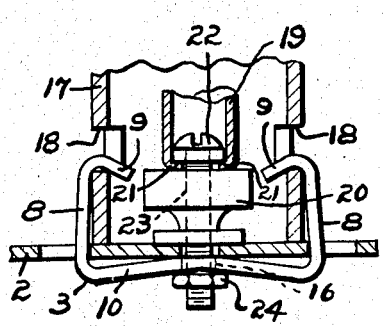
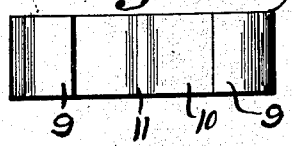
Inventor:
Wilford C. MacFadden.
By Walter S. Jones Att'y Patented Feb. 4, 1941

2,230,898

UNITED STATES PATENT OFFICE 2,230,898

FASTENER ATTACHED STRUCTURE AND FASTENER FOR THE SAME

Wilford C. MacFadden, Philadelphia, Pa., assignor, by mesne assignments, to Philco Radio and Television Corporation, Philadelphia, Pa., a corporation of Delaware Application November 15, 1937, Serial No. 174,641

2 Claims. (Cl. 248—361)

My invention relates to improvements in a fastening device for securing an electrical or the like unit to a supporting structure and to installations of the same.

Referring to the drawing, which represents preferred embodiments of my invention:

Figure 1 is a top plan view showing one method by which an electrical unit, such as a coil form, may be secured to a support through means of my improved fastener member;

Fig. 2 is a front view of the installation shown in Fig. 1 but showing only a portion of the coil form;

Fig. 3 is a section taken along the line 3—3 of Fig. 1 but showing only a portion of the coil form;

Fig. 4 is a front view of a portion of an electrical unit with my fastener member in assembly therewith;

Fig. 5 is a sectional view of the installation shown in Fig. 4;

Fig. 6 is a view similar to Fig. 4 showing one method by which the fastener member is assembled with the electrical unit;

Fig. 7 is a bottom view of one form of supporting panel to which the electrical unit is secured;

Fig. 8 is a bottom view of the installation shown in Fig. 1 with my fastener member in one position relative to the supporting panel;

Fig. 9 is a view similar to that of Fig. 8 but showing my fastener member moved into final fixed position relative to the support;

Fig. 10 is a bottom view of an installation showing the method by which an electrical unit may be secured to a modified form of supporting panel through means of my improved fastener member;

Fig. 11 is a section taken along the line 11—11 of Fig. 10;

Fig. 12 is a view, partly in section, showing a third method by which an electrical unit, such as a transformer, is secured to a supporting panel through means of my fastener member; and Fig. 13 is a top view of my fastener member per se.

An object of my invention is to provide a simple and inexpensive fastening means for securing an electrical unit, such as a coil form, condenser, transformer or the like, to a supporting panel of a radio set. It is understood, however, that I do not wish to limit my fastener member to assembly with units of the classes illustrated and described because the fastener member may be used advantageously for securing other articles to a supporting structure without departing from the scope and spirit of my present invention.

Referring to my first form of installation illustrated in Figs. 1 through 9 of the drawing, I have shown an electrical unit such as a coil form of the type commonly used in a radio set. The coil form has a tubular-shaped outer covering 1 of cardboard or other relatively stiff material which is adapted to be wound with a wire coil (not shown) in a manner well known in the art. The unit is secured to a relatively thin supporting panel 2 through means of my improved, preferably U-shaped, fastener member 3 in a way to be fixed in upstanding relation to the panel.

My preferred form of outer covering 1 has a pair of apertures 4—4 in opposed sides thereof near its lower end for receiving portions of the fastener member 3 so as to enable the fastener member to be secured to the unit by a method to be described. In the method of securing the electrical unit to the supporting panel 2, shown in Figs. 1-9, I have provided a panel having a pair of spaced narrow openings 5—5 extending inwardly from a free edge 2ª thereof, as most clearly shown in Fig. 7. At the innermost ends of the openings 5—5 I have formed openings 6 extending laterally from each of the openings 5—5 in the same direction so as to provide shoulders 7—7 (Fig. 7) which face away from the edge 2ª of the panel 2 for a purpose to be described. Referring in detail to my preferred form of fastener member 3, I have shown a fastener member having a pair of oppositely-disposed arms 8—8 spaced one from another a distance which is slightly greater than the width of material 5ª of the panel 2 between the openings 5—5. At the free ends of the arms 8—8 I have provided inwardly-extending hook-like portions 9—9 adapted to engage the covering 1 through the apertures 4—4 thereof for securing the fastener member to the coil form. The arms 8—8 are connected together at their ends opposed to their free ends by a connecting portion 10. The connecting portion 10 is normally bulged inwardly toward the hook-shaped portions 9—9 thereby providing an expansible and contractible portion capable of effecting a spring engagement with a bottom surface of the support 2 when the parts of the installation have been finally assembled together. The fastener member 3 may easily be assembled with the coil form through first inserting the hook-shaped portion 9 of one of the arms 8 through an aperture 4 of the covering 1 so that the fastener member will take a position relative to the covering 1 substantially as shown in Fig. 6. Next, the hook-shaped portion of the other arm 8 is sprung into the other aperture 4 with the result that the hook-shaped portions 9—9 of the fastener member engage material of the covering 1 adjacent the respective apertures 4, in the manner shown in Fig. 5, so as to secure the fastener member in assembly with the covering. When the fastener member is in final attachment with the covering 1 the connecting portion 10 of the fastener member is positioned beneath the lower end of the covering with the apex 11 of the bulged portion 10 spaced from the horizontal plane of the lowermost end of the covering 1 a distance less than the thickness of the supporting panel 2.

In attaching the coil form to my first form of supporting panel 2, narrow edges of the arms 8—8 are moved into the narrow openings 5—5. During this action the material 5a of the panel 2 between the openings 5—5 is moved between the connecting portion 10 and the lower end of the covering 1 so as to engage the apex 11 of the portion 10 with a lower surface of the panel. This engagement expands the inwardly-bulged portion tending to straighten the same with the result that the bulged portion, in its effort to retake its normal bulged shape, engages the lower surface of the panel in a spring grip. It will be noticed that opposite sides 12 of the portion 5a adjacent the edge 2a may converge toward each other (Figs. 7–9) so as to provide a lead for easy insertion of the portion 5a between the connecting portion 10 and the lower end of the covering 1. Next, the arms 8—8 are moved through the openings 5—5 until their edges abut the inner ends of the openings with the result that the fastener member takes a position substantially as shown in Fig. 8. Finally, the electrical unit is moved laterally so that the legs 8—8 are moved into the openings 6 and thereby disposed in final position behind the shoulders 7—7 of the panel. Thus the unit is detachably secured to the supporting panel through resilient engagement of the connecting portion 10 with a lower surface of the panel 2 aided by the position of the arms 8—8 behind the shoulders 7—7. The electrical unit may easily be disengaged from the support through reversing the action hereinabove described. Although in the form of panel member illustrated in Figs. 1–9 the openings 5—5 extend from a free edge of the panel, it is understood that secure attachment of the parts could be carried out if the openings 5—5 were to extend from an opening disposed within the periphery of the panel and having a size suitable for receiving the fastener member.

Referring to Figs. 10 and 11 of the drawing, I have shown a second method by which an electrical unit, such as a coil form, is secured to a supporting panel of modified construction by means of a fastener member which is substantially of the form illustrated and described in connection with the fastener illustrated in connection with my first form of invention. The supporting panel has an integral finger-shaped portion 14 extending from the body 13 thereof and adapted to be disposed between the connecting portion 10 of the fastener member 3 and a lower end of the coil form. In my second form of installation the lower surface of the finger 14 is resiliently engaged by the connecting portion 10 of the fastener member substantially in the manner in which the lower surface of the portion 5a of my first form of panel is engaged by the fastener member. As a means for preventing the fastener member from working off the finger 14, I have formed a bump 15 extending beneath the lower surface of the finger 14 and spaced laterally thereon from the body 13 of the panel substantially as shown in Fig. 10. Assembly of an electrical unit with my second form of supporting panel is a relatively easy matter and may be carried out through moving the unit with assembled fastener toward the outermost free end of the finger 14 so that the finger is disposed between the connecting portion 10 of the fastener member and the lower end of the electrical unit 1. Then the unit assembly is moved along the finger 14 until the connecting portion 10 is finally disposed between the bump 15 and the body 13 of the panel substantially as shown in Fig. 10. The connecting portion 10 expands during movement over the bump 15 and then contracts to engage behind the bump so as to prevent ready withdrawal of the fastener member from the support.

Fig. 12 of the drawing is illustrative of a method by which my improved fastener member may be used in combination with a rivet, bolt or the like, for securing an article of manufacture to a supporting panel. The installation which I have chosen to illustrate the third use of my fastener member comprises an electrical unit in the form of an I. F. transformer of a type well known in the radio art secured to a supporting panel 2 by means of my fastener member 3. The fastener 3 is of the same type illustrated in connection with the other forms of my invention but has an opening 16 in the connecting portion 10 thereof. The transformer, only a portion of which is shown in the drawing, includes a metal can 17 having apertures 18 in opposite sides thereof for receiving the hook-like portions 9—9 of the fastener member 3. Disposed within the can 17 is an iron core 19 spaced from the panel 2 by a block 20. The core 19 has an outer covering of cardboard or the like material with inturned ends 21. Assembly of the transformer device with the panel 2 is carried out by means of a bolt having a head portion 22 disposed within the core 19 and a shank 23 extending through the lower end of the core, the spacing means 20, the support 2 and the aperture 16 of the connecting portion 10 of the fastener member 3. A nut 24 is engaged with the shank 22 of the bolt and screwed up against the lower surface of the connecting portion 10 of the fastener member to draw the transformer unit tightly against the panel 2.

Thus by my invention I have provided a very simple and inexpensive fastener member which is particularly adapted for securing articles of manufacture, such as electrical devices and other parts, to a supporting panel. My improved methods of assembly are of great commercial value to the radio set manufacturer because through means of the same it is possible for an electrical unit, such as a coil form or transformer of the type described, to be quickly secured to the panel of a radio set in a way to take up a minimum amount of space.

Although I have illustrated and described preferred embodiments of my invention, I do not wish to be limited thereby because the scope of my invention is best defined in the following claims.

I claim:

1. A support for an article-fastening member having a pair of spaced flat arms, said support comprising a relatively thin supporting panel provided with a pair of spaced slots into which said arms may be moved edgewise, said slots being of a length greater than the width of said arms and of a width at least as great as the thickness of said arms; and a pair of internal shoulders formed by lateral extensions of said slots in the same direction and intermediate the ends of said slots, whereby said arms may be readily inserted in said slots and disposed behind said shoulders for retention thereby by laterally shifting the arms after their aforesaid edgewise movement.

2. A support for a tubular-shaped article having a fastening member including a pair of spaced flat arms, said support comprising a relatively thin supporting panel provided with a pair of spaced slots into which said arms may be moved edgewise, said slots being of a length greater than the width of said arms and of a width at least as great as the thickness of said arms; and a pair of internal shoulders formed by lateral extensions of said slots in the same direction and intermediate the ends of said slots, whereby said arms may be readily inserted in said slots and disposed behind said shoulders for retention thereby by laterally shifting the arms after their aforesaid edgewise movement, the distance between the center lines of said slots being at least as great as the external diameter of said tubular-shaped article.

WILFORD C. MacFADDEN.